(12) United States Patent
Miura et al.

(10) Patent No.: US 11,518,125 B2
(45) Date of Patent: Dec. 6, 2022

(54) METHOD FOR MANUFACTURING COGGED V-BELTS

(71) Applicant: Mitsuboshi Belting Ltd., Kobe (JP)

(72) Inventors: Yoshihiro Miura, Hyogo (JP); Susumu Takaba, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 227 days.

(21) Appl. No.: 16/328,188

(22) PCT Filed: Aug. 25, 2017

(86) PCT No.: PCT/JP2017/030465
§ 371 (c)(1),
(2) Date: Feb. 25, 2019

(87) PCT Pub. No.: WO2018/043316
PCT Pub. Date: Mar. 8, 2018

(65) Prior Publication Data
US 2019/0232587 A1  Aug. 1, 2019

(30) Foreign Application Priority Data

Aug. 29, 2016 (JP) .............................. JP2016-167011
Aug. 21, 2017 (JP) .............................. JP2017-158621

(51) Int. Cl.
*B29D 29/10* (2006.01)
*F16G 5/20* (2006.01)
(Continued)

(52) U.S. Cl.
CPC ........... *B29D 29/106* (2013.01); *B29D 29/10* (2013.01); *F16G 5/06* (2013.01); *F16G 5/20* (2013.01); *F16G 5/08* (2013.01)

(58) Field of Classification Search
CPC ..................................................... B29D 29/106
See application file for complete search history.

(56) References Cited

U.S. PATENT DOCUMENTS 1,920,525 A * 8/1933 Roderwald .......... B29D 29/106
156/138
2,336,149 A * 12/1943 Freedlander ......... B29D 29/106
474/262
(Continued)

FOREIGN PATENT DOCUMENTS

| CN | 1230637 C | 12/2005 |
| CN | 1821614 A | 8/2006 |

(Continued)

OTHER PUBLICATIONS

Machine Translation JP2000153558A (Year: 2000).*
(Continued)

*Primary Examiner* — Francisco W Tschen
*Assistant Examiner* — Wayne K. Swier
(74) *Attorney, Agent, or Firm* — Banner & Witcoff, Ltd.

(57) ABSTRACT

A method for manufacturing a cogged V-belt having a plurality of cogs, includes: an unvulcanized sleeve formation step of forming an unvulcanized sleeve by laminating a plurality of unvulcanized rubber sheets that contain at least an unvulcanized rubber sheet for a compression rubber layer and an unvulcanized rubber sheet for a tension rubber layer; a vulcanized sleeve formation step of forming a vulcanized sleeve by vulcanizing the unvulcanized sleeve; and a cog formation step of forming the plurality of cogs on the compression rubber layer after the vulcanized sleeve forming step.

3 Claims, 5 Drawing Sheets

(51) Int. Cl.
*F16G 5/06* (2006.01)
*F16G 5/08* (2006.01)

(56) References Cited

U.S. PATENT DOCUMENTS

| | | | | |
|---|---|---|---|---|
| 2,337,985 | A * | 12/1943 | Freedlander | B29D 29/10 |
| | | | | 156/138 |
| 3,830,113 | A | 8/1974 | Bruns | |
| 4,264,315 | A * | 4/1981 | Imamura | F16G 5/08 |
| | | | | 156/142 |
| 4,737,138 | A * | 4/1988 | Komai | B29D 29/106 |
| | | | | 474/254 |
| 5,244,080 | A * | 9/1993 | Bierbaum | B29D 29/06 |
| | | | | 40/524 |
| 6,572,505 | B1 | 6/2003 | Knutson | |
| 6,632,151 | B1 | 10/2003 | Knutson | |
| 9,506,527 | B2 * | 11/2016 | South | F16G 5/20 |
| 2003/0073533 | A1 | 4/2003 | Knutson | |
| 2003/0078125 | A1 | 4/2003 | Knutson | |
| 2003/0116255 | A1 | 6/2003 | Kopang | |
| 2004/0048709 | A1 * | 3/2004 | Knutson | F16G 5/20 |
| | | | | 474/263 |
| 2006/0154770 | A1 | 7/2006 | Takaba et al. | |
| 2017/0248208 | A1 * | 8/2017 | Tamura | F16G 1/16 |

FOREIGN PATENT DOCUMENTS

| | | | |
|---|---|---|---|
| EP | 0010919 A1 | 5/1980 | |
| JP | S58-217337 A | 12/1983 | |
| JP | 03219147 A * | 9/1991 | B29C 70/545 |
| JP | 2000-153558 A | 6/2000 | |
| JP | 2000153558 A * | 6/2000 | F16G 3/07 |
| JP | 2003-536024 A | 12/2003 | |
| WO | WO-2016068296 A1 * | 5/2016 | F16G 3/07 |

OTHER PUBLICATIONS

Machine translation JPH03219147A (Year: 1991).*
Sep. 19, 2017—International Search Report—Intl App PCT/JP2017/030465.
Mar. 3, 2020—(EP) Extended Search Report—App 17846321.2.
Mar. 3, 2020—(CN) Notification of First Office Action—App 201780042490.3, Eng Tran.
May 7, 2019—(JP) Notification of Reasons for Refusal—App 2017-158621, Eng Tran.
Nov. 3, 2020—(CN) Notification of the Second Office Action—App 201780042490.3, Eng Tran.
Mar. 12, 2021—(CN) Notification of the Third Office Action—App 201780042490.3, Eng Tran.
Dec. 9, 2021—(EP) Office Action—App 17846321.2.

* cited by examiner

[FIG. 1]
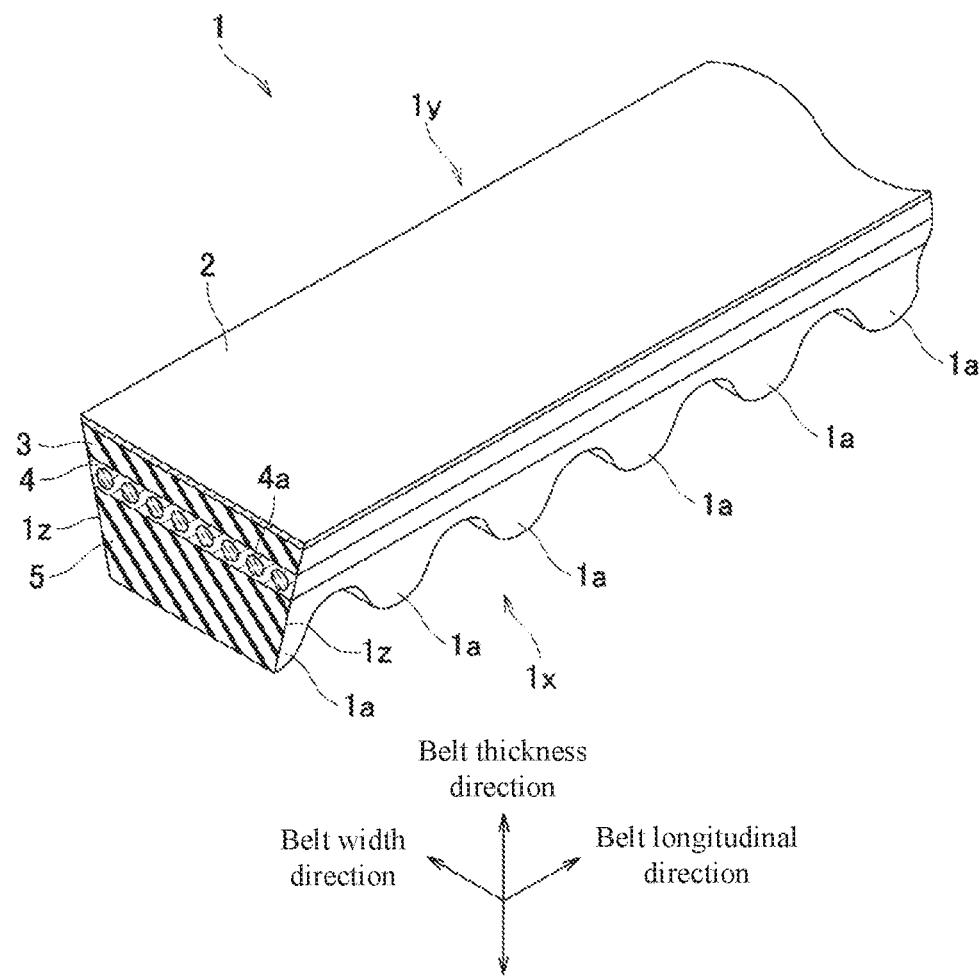

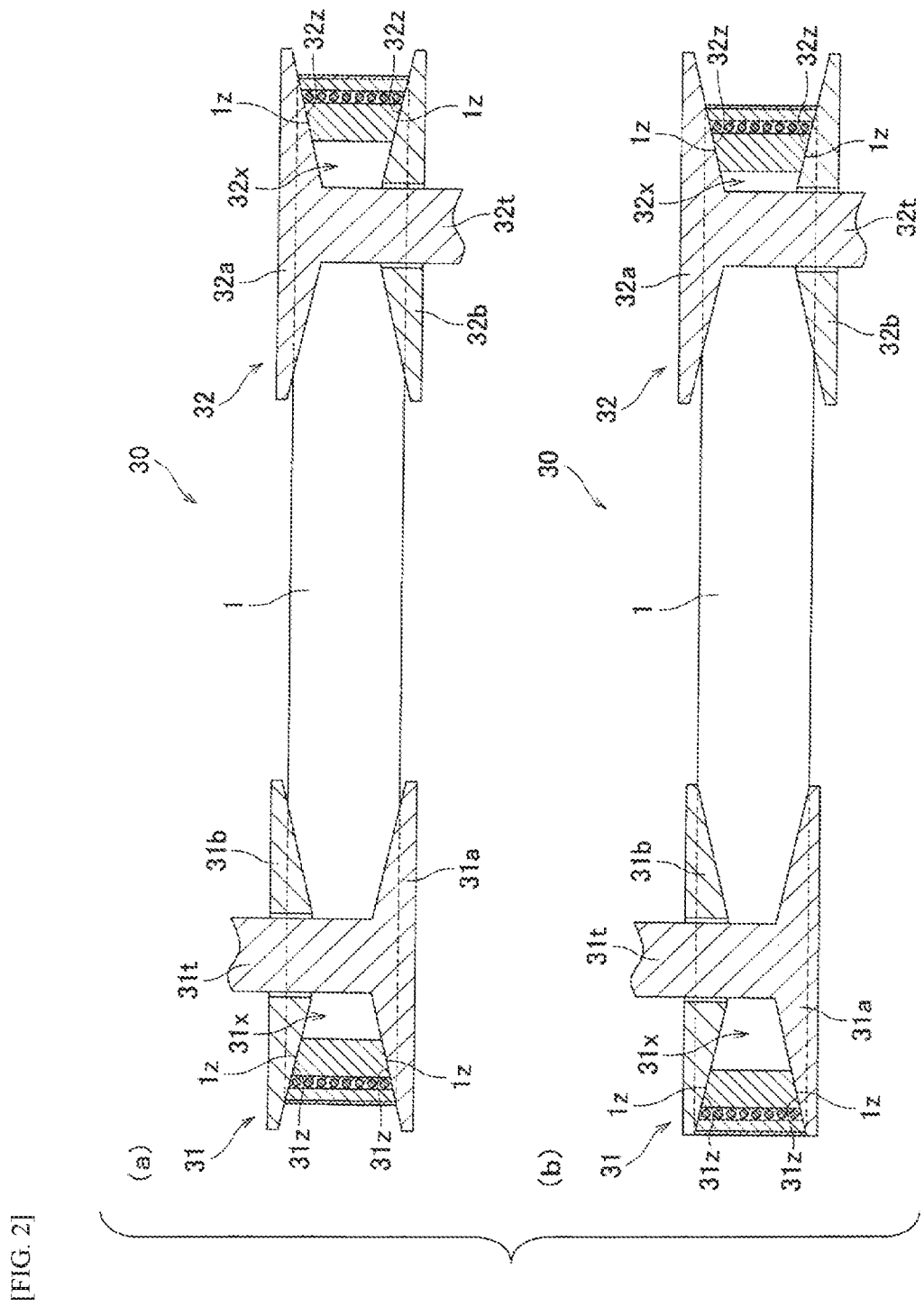

[FIG. 3]
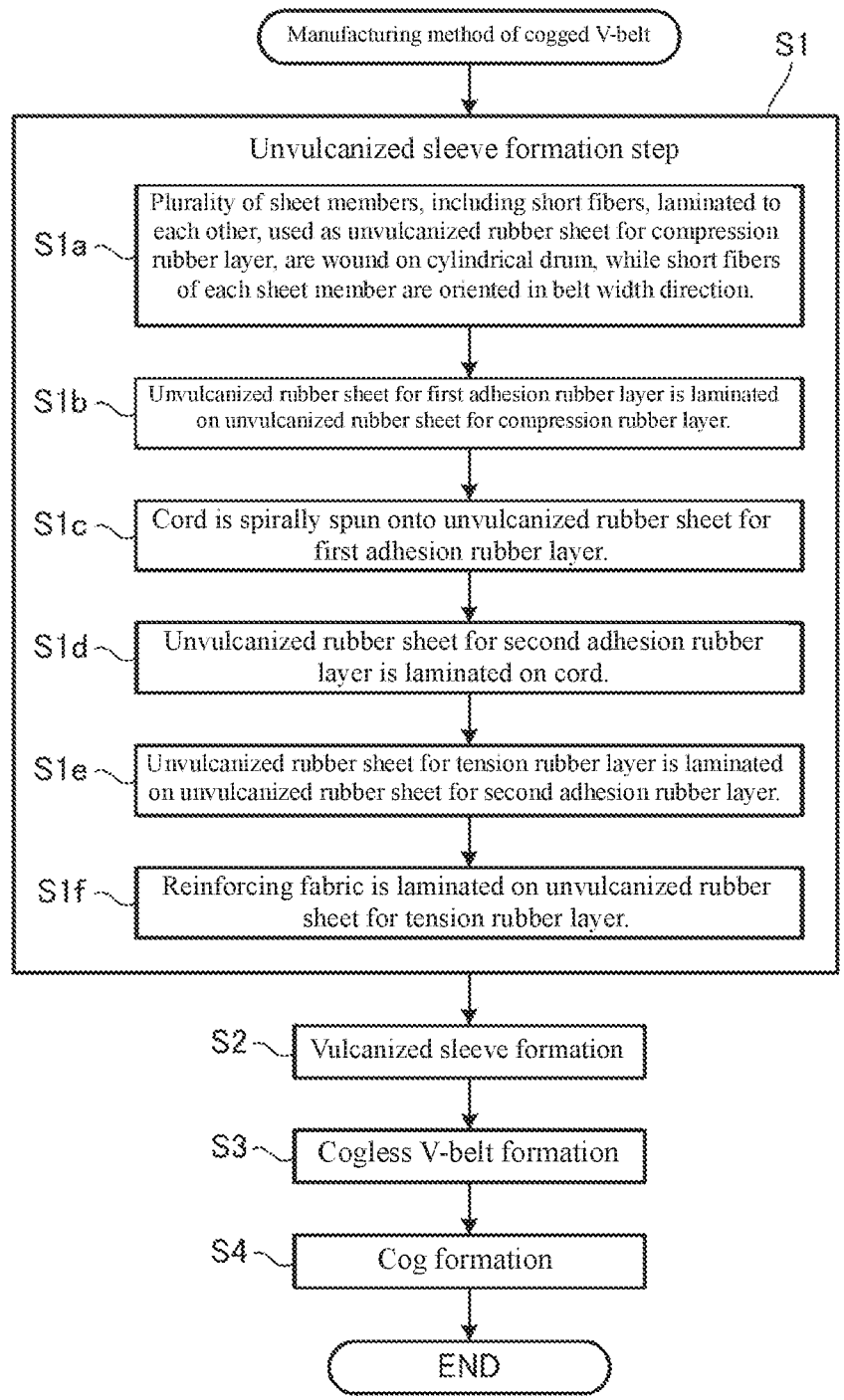

[FIG. 4]
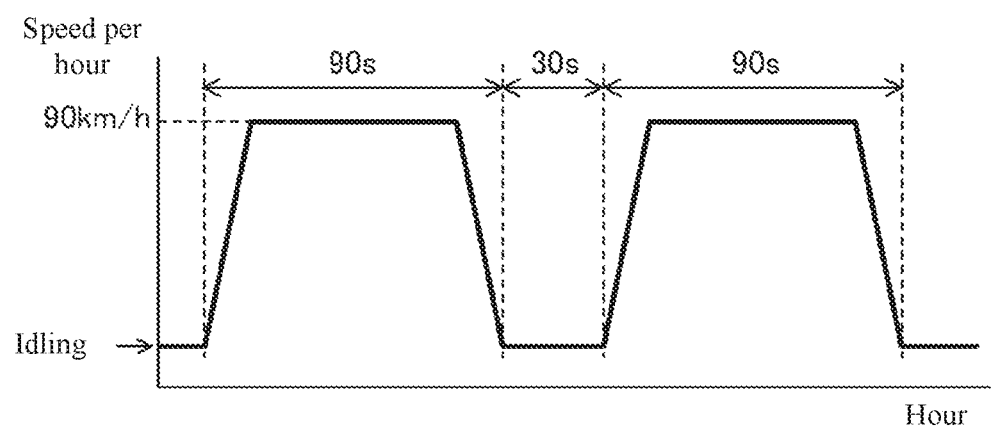

[FIG. 5]
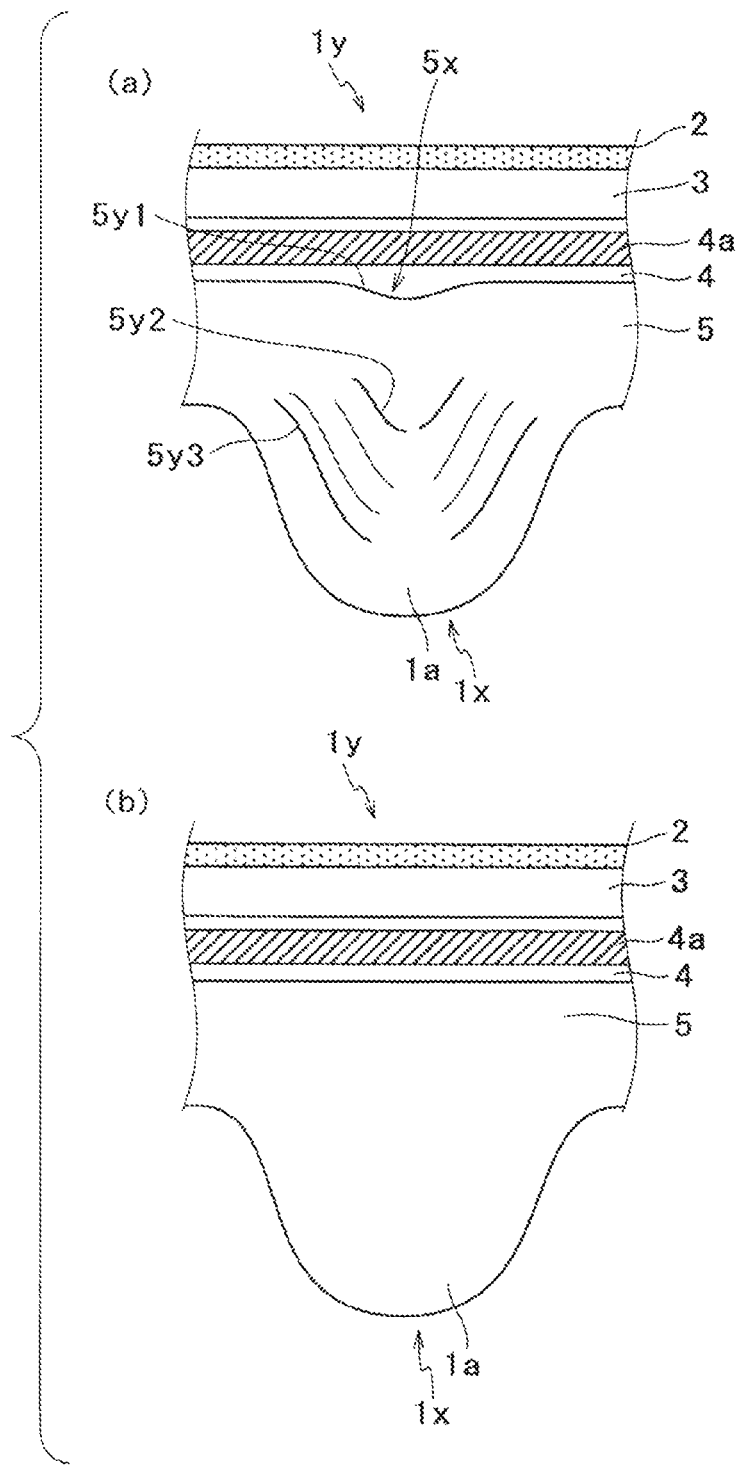

METHOD FOR MANUFACTURING COGGED V-BELTS

CROSS REFERENCE TO RELATED APPLICATIONS

This is a U.S. National Phase Application under 35 U.S.C. § 371 of International Application No. PCT/JP2017/030465, filed Aug. 25, 2017, which claims priority to Japanese Application Nos. 2016-167011, filed Aug. 29, 2016 and 2017-158621, filed Aug. 21, 2017, which was published Under PCT Article 21(2), the entire contents of which are incorporated herein by reference.

TECHNICAL FIELD

The present invention relates to a method for manufacturing a cogged V-belt having a plurality of cogs on the belt inner peripheral side, which cogs are arranged each extending in the belt width direction and spaced apart from each other in the belt longitudinal direction.

BACKGROUND ART

The cogged V-belt has excellent flexibility due to a plurality of cogs, and is applied to general industrial machines, agricultural machines, snowmobiles, motorcycles, accessory-drive systems of automobiles, and the like, and also applied to continuously variable transmission in some cases.

As for the method for manufacturing a cogged V-belt, there is a known technique in which a cylindrical drum having concave and convex on its outer peripheral surface is used, a plurality of unvulcanized rubber sheets (unvulcanized rubber sheets to be compression rubber layer, outer rubber layer (=tension rubber layer, etc.) are wrapped around the outer peripheral surface of the drum to form an unvulcanized sleeve and then, the unvulcanized sleeve is heated and pressurized to obtain a vulcanized sleeve having a plurality of cogs corresponding to the concave and convex of the drum (see PTL 1).

CITATION LIST

Patent Literature

[PTL 1] JP-A2000-153558

SUMMARY OF INVENTION

Technical Problem

In the method described above, when pressurizing the unvulcanized sleeve, the unvulcanized rubber sheet for a compression rubber layer to be the compression rubber layer flows along the concave and convex of the drum. At this time, in the case where the unvulcanized rubber sheet for a compression rubber layer shows different flowing manners in concave portion and convex portion of the drum, or in the case where the unvulcanized rubber sheet for a compression rubber layer draws another unvulcanized rubber sheet on the belt outer peripheral side when the unvulcanized rubber sheet flows into the concave portion of the drum, the flowing of the unvulcanized rubber sheet for a compression rubber layer may become non-uniform. Consequently, in the vulcanized sleeve, the thickness of the portion (cog portion) where the cog is formed in the compression rubber layer may become non-uniform. For example, a recess may be formed in the belt outer peripheral side of the cog portion in the compression rubber layer, which may lead to a state where another rubber layer composed of the aforementioned other unvulcanized rubber sheet enters in the recess. In the case where such a cogged V-belt is used, a crack starting from the recess may be generated at the interface between the compression rubber layer and the other rubber layer, and further, the compression rubber layer may be peeled from the other rubber layer.

An object of the present invention is to provide a method for manufacturing a cogged V-belt, which can suppress occurrence of cracks starting from a recess of a compression rubber layer and peeling of the compression rubber layer.

Solution to Problem

According to the present invention, there is provided a method for manufacturing a cogged V-belt having a plurality of cogs on the belt inner peripheral side, which cogs are arranged each extending in the belt width direction and spaced apart from each other in the belt longitudinal direction, the method including: an unvulcanized sleeve formation step of laminating a plurality of unvulcanized rubber sheets including at least an unvulcanized rubber sheet for a compression rubber layer to be a compression rubber layer disposed on the belt inner peripheral side and an unvulcanized rubber sheet for a tension rubber layer to be a tension rubber layer disposed on the belt outer peripheral side, thereby forming an unvulcanized sleeve; a vulcanized sleeve formation step of vulcanizing the unvulcanized sleeve after the unvulcanized sleeve formation step, thereby forming a vulcanized sleeve; and a cog formation step of forming the plurality of cogs in the compression rubber layer after the vulcanized sleeve formation step.

The present invention employs a method in which an unvulcanized sleeve is vulcanized to form a vulcanized sleeve and then a plurality of cogs are formed, instead of a method of pressurizing an unvulcanized sleeve to flow an unvulcanized rubber sheet for a compression rubber layer to form a plurality of cogs. Therefore, the problem that the flowing of the unvulcanized rubber sheet for a compression rubber layer becomes non-uniform, which causes a recess on the belt outer peripheral side of the cog portion in the compression rubber layer, can be suppressed. Consequently, occurrence of cracks starting from the recess of the compression rubber layer and peeling of the compression rubber layer from another rubber layer can be suppressed.

The unvulcanized rubber sheet for a compression rubber layer, which is laminated in the unvulcanized sleeve formation step, may contain short fibers oriented in the belt width direction. According to the aforementioned configuration, since the short fibers are oriented in the belt width direction, high anisotropy can be achieved and the elastic modulus in the belt width direction can be increased to effectively improve the lateral pressure resistance. Particularly in the case of being applied to a continuously variable transmission, since the cogged V-belt is used in a harsh layout with being largely bent and under a high load, high durability and fuel saving performance (power transmission performance) are required. In this regard, according to the aforementioned configuration, since it is possible to improve the lateral pressure resistance (resistance to deformation due to lateral pressure), which is one of important factors balancing durability and fuel saving performance, both durability and fuel saving performance can be suitably enhanced.

Therefore, the belt can be also applied to a continuously variable transmission or the like, which requires high load transmission. Furthermore, in the configuration in which short fibers are blended into the compression rubber layer, in the case of employing a method in which, as described in PTL 1, an unvulcanized sleeve is pressurized to flow an unvulcanized rubber sheet for a compression rubber layer to form a plurality of cogs, since the flowing of the unvulcanized rubber sheet for a compression rubber layer becomes non-uniform, the orientation of the short fibers is also disturbed. Meanwhile, the present invention employs a method in which an unvulcanized sleeve is vulcanized to form a vulcanized sleeve and then a plurality of cogs are formed, instead of the method of pressurizing an unvulcanized sleeve to flow an unvulcanized rubber sheet for a compression rubber layer to form a plurality of cogs. Therefore, the problem that the flowing of the unvulcanized rubber sheet for a compression rubber layer becomes non-uniform can be suppressed, and the disturbance of the orientation of short fibers can be also suppressed.

In the unvulcanized sleeve formation step, the unvulcanized rubber sheet for a compression rubber layer may include a plurality of sheet members each containing the short fibers and laminated with each other. According to the aforementioned configuration, since the short fibers are oriented in each of the plurality of sheet members having a relatively small thickness and they are laminated with each other, the orientation of short fibers can be easily achieved as compared with the case where the short fibers are oriented in a single sheet member which is used as the unvulcanized rubber sheet for a compression rubber layer. Furthermore, in the configuration in which the unvulcanized rubber sheet for a compression rubber layer includes a plurality of sheet members, in the case of employing a method in which, as described in PTL 1, an unvulcanized sleeve is pressurized to flow an unvulcanized rubber sheet for a compression rubber layer to form a plurality of cogs, since the flowing of the unvulcanized rubber sheet for a compression rubber layer becomes non-uniform, peeling can occur between the plurality of sheet members when the belt is used. Meanwhile, the present invention employs a method in which an unvulcanized sleeve is vulcanized to form a vulcanized sleeve and then a plurality of cogs are formed, instead of the method of pressurizing an unvulcanized sleeve to flow an unvulcanized rubber sheet for a compression rubber layer to form a plurality of cogs. Therefore, the problem that the flowing of the unvulcanized rubber sheet for a compression rubber layer becomes non-uniform can be suppressed, and peeling hardly occurs between the plurality of the sheet members.

In the unvulcanized sleeve formation step, an unvulcanized rubber sheet for an adhesion rubber layer to be an adhesion rubber layer may be disposed between the unvulcanized rubber sheet for a compression rubber layer and the unvulcanized rubber sheet for a tension rubber layer. In the case of employing a method in which, as described in PTL 1, an unvulcanized sleeve is pressurized to flow an unvulcanized rubber sheet for a compression rubber layer to form a plurality of cogs, the unvulcanized rubber sheet for a compression rubber layer draws the unvulcanized rubber sheet for an adhesion rubber layer when flowing into the concave portion of the drum, and a recess may be formed in the belt outer peripheral side of the cog portion in the compression rubber layer, which may lead to a state where the adhesion rubber layer enters in the recess. Meanwhile, the present invention employs a method in which an unvulcanized sleeve is vulcanized to form a vulcanized sleeve and then a plurality of cogs are formed, instead of the method of pressurizing an unvulcanized sleeve to flow an unvulcanized rubber sheet for a compression rubber layer to form a plurality of cogs. Therefore, the problems such as the drawing of the unvulcanized rubber sheet for an adhesion rubber layer and entering the adhesion rubber layer into the recess can be suppressed, cracks starting from the recess are hardly generated at the interface between the compression rubber layer and the adhesion rubber layer, and peeling of the compression rubber layer from the adhesion rubber layer can be also suppressed.

In the unvulcanized sleeve formation step, a cord extending in the belt longitudinal direction may be disposed in the unvulcanized rubber sheet for an adhesion rubber layer. According to the aforementioned configuration, since the cord is embedded in the adhesion rubber layer, durability is improved as compared with the case where the cord is not embedded in the adhesion rubber layer but is just in contact with the adhesion rubber layer.

Advantageous Effects of Invention

The present invention employs a method in which an unvulcanized sleeve is vulcanized to form a vulcanized sleeve and then a plurality of cogs are formed, instead of a method of pressurizing an unvulcanized sleeve to flow an unvulcanized rubber sheet for a compression rubber layer to form a plurality of cogs. Therefore, the problem that the flowing of the unvulcanized rubber sheet for a compression rubber layer becomes non-uniform, which causes a recess on the belt outer peripheral side of the cog portion in the compression rubber layer, can be suppressed. Consequently, occurrence of cracks starting from the recess of the compression rubber layer and peeling of the compression rubber layer from another rubber layer can be suppressed.

BRIEF DESCRIPTION OF DRAWINGS

FIG. 1 is a perspective cross-sectional view illustrating a cogged V-belt according to an embodiment of the present invention.

FIGS. 2 (a) and (b) of FIG. 2 are cross-sectional views respectively illustrating an example in which a cogged V-belt according to an embodiment of the present invention is applied to a continuously variable transmission.

FIG. 3 is a flowchart illustrating a method for manufacturing a cogged V-belt according to an embodiment of the present invention.

FIG. 4 is a graph showing a running pattern of a running test for in-vehicle durability of the cogged V-belts according to Examples and Comparative Examples.

FIG. 5 (a) of FIG. 5 is a schematic view illustrating a side surface of a cogged V-belt according to Comparative Example after the durability running test. (b) of FIG. 5 is a schematic view illustrating a side surface of a cogged V-belt according to Example after the durability running test.

DESCRIPTION OF EMBODIMENTS

A cogged V-belt 1 according to an embodiment of the present invention has a structure in which a reinforcing fabric 2, a tension rubber layer 3, an adhesion rubber layer 4, and a compression rubber layer 5 are sequentially laminated from a belt outer peripheral side $1y$ toward a belt inner peripheral side $1x$, as illustrated in FIG. 1. In the adhesion rubber layer 4, a cord 4a extending in the belt longitudinal direction is embedded.

The tension rubber layer 3, the adhesion rubber layer 4 and the compression rubber layer 5 are formed of rubber compositions containing a rubber component. The rubber compositions constituting the tension rubber layer 3 and the compression rubber layer 5 further contain short fibers.

As the rubber component, vulcanizable or crosslinkable rubber may be used. Examples thereof include diene rubbers (natural rubber, isoprene rubber, butadiene rubber, chloroprene rubber, styrene butadiene rubber (SBR), acrylonitrile butadiene rubber (nitrile rubber), hydrogenated nitrile rubber, etc.), ethylene-α-olefin elastomers, chlorosulfonated polyethylene rubbers, alkylated chlorosulfonated polyethylene rubbers, epichlorohydrin rubbers, acrylic rubbers, silicone rubbers, urethane rubbers, and fluororubbers, which may be used either alone or in combination of two or more of them. Preferred rubber components are an ethylene-α-olefin elastomer (ethylene-propylene copolymer (EPM), ethylene-propylene-diene terpolymer (EPDM), etc.) and a chloroprene rubber. A particularly preferred rubber component is a chloroprene rubber. The chloroprene rubber may be of either sulfur-modified type or non-sulfur-modified type.

Additives may be added to the rubber composition. Examples of the additives include vulcanizing agents or crosslinking agents (or crosslinking agent-like agents) (sulfur vulcanizing agents, etc.), co-crosslinking agents (bismaleimides, etc.), vulcanization aids or vulcanization accelerators (thiuram accelerators, etc.), vulcanization retarders, metal oxides (zinc oxide, magnesium oxide, calcium oxide, barium oxide, iron oxide, copper oxide, titanium oxide, aluminum oxide, etc.), reinforcing agents (e.g., carbon black, and silicon oxides such as hydrated silica), fillers (clay, calcium carbonate, talc, mica, etc.), softeners (e.g., oils such as paraffin oil and naphthenic oil, etc.), processing agents or processing aids (stearic acid, metal salts of stearic acid, wax, paraffin, fatty acid amide, etc.), antiaging agents (antioxidants, heat aging inhibitors, bending-crack inhibitors, ozone-deterioration inhibitors, etc.), coloring agents, tackifiers, plasticizers, coupling agents (silane coupling agents, etc.), stabilizers (ultraviolet absorbers, heat stabilizers, etc.), flame retardants, and antistatic agents, which may be used either alone or in combination of two or more of them. The metal oxide may act as a crosslinking agent. In particular, the rubber composition constituting the adhesion rubber layer 4 may contain an adhesion improver (resorcinol-formaldehyde co-condensate, amino resin, etc.).

Examples of the short fibers include synthetic fibers such as polyolefin fibers (polyethylene fibers, polypropylene fibers, etc.), polyamide fibers (polyamide 6 fibers, polyamide 66 fibers, polyamide 46 fibers, aramid fibers, etc.), polyalkylene arylate fibers (e.g., $C_{2-4}$ alkylene $C_{6-14}$ arylate fibers such as polyethylene terephthalate (PET) fibers and polyethylene naphthalate (PEN) fibers), vinylon fibers, polyvinyl alcohol fibers, and polyparaphenylene benzobisoxazole (PBO) fibers; natural fibers such as cotton, linen, and wool; and inorganic fibers such as carbon fibers, which may be used either alone or in combination of two or more of them. The short fibers may be subjected to a conventional adhesion treatment (or surface treatment) in order to improve dispersibility and adhesiveness in the rubber composition. For example, the short fibers may be treated with a resorcinol-formalin-latex (RFL) solution or the like.

The rubber compositions constituting the tension rubber layer 3, the adhesion rubber layer 4 and the compression rubber layer 5 may be the same as each other or may be different from each other. Similarly, the short fibers contained in the tension rubber layer 3 and the compression rubber layer 5 may be the same as each other or may be different from each other.

In the adhesion rubber layer 4, a plurality of cords 4a respectively extend in the belt longitudinal direction, and are spaced apart from each other at a predetermined pitch in the belt width direction.

The cord 4a is composed of, for example, twisted (e.g., organzine, single-twisted, and Lang lay) cords using multifilament yarns. An average cord diameter of the cord 4a (fiber diameter of the twisted cord) may be, for example, from 0.5 to 3 mm, preferably from 0.6 to 2.0 mm, and more preferably from about 0.7 to 1.5 mm.

As the fibers constituting the cord 4a, the fibers exemplified as short fibers may be used. From the viewpoint of high modulus, as the fibers constituting the cord 4a, use can be made of synthetic fibers such as polyamide fibers (polyamide 6 fibers, polyamide 66 fibers, polyamide 46 fibers, aramid fibers, etc.), and polyalkylene arylate fibers (e.g., $C_{2-4}$ alkylene $C_{6-14}$ arylate fibers such as polyethylene terephthalate (PET) fibers and polyethylene naphthalate (PEN) fibers); and inorganic fibers such as carbon fibers, and a polyamide fiber and a polyalkylene arylate fiber are preferably used. The fibers constituting the cord 4a may be a multifilament yarn. The fineness of the cord 4a composed of multifilament yarns may be, for example, from about 2,000 to 10,000 denier (particularly from 4,000 to 8,000 denier). The multifilament yarns may contain, for example, from 100 to 5,000, preferably from 500 to 4,000, and more preferably from about 1,000 to 3,000 of monofilament yarns. The cord 4a may be subjected to a conventional adhesion treatment (or surface treatment) as in the short fibers.

The reinforcing fabric 2 is made of, for example, a fabric material such as woven fabric, wide angle canvas, knitted fabric, nonwoven fabric (preferably woven fabric). The reinforcing fabric 2 may be subjected to a friction process in which a fabric material is subjected to an adhesion treatment (e.g., dipping treatment with an RFL solution) to rub the rubber composition into the fabric material, or may be subjected to a process for laminating a sheet-shape rubber composition and the fabric material, followed by being laminated on the surface of the tension rubber layer 3.

The cross-section of the cogged V-belt 1, which is orthogonal to the belt longitudinal direction, has an inverted trapezoidal shape in which the belt width decreases from the belt outer peripheral side 1y toward the belt inner peripheral side 1x. A plurality of cogs 1a are formed on the belt inner peripheral side 1x of the cogged V-belt 1. The plurality of cogs 1a are formed in the compression rubber layer 5, respectively extend in the belt width direction, and are spaced apart from each other in the belt longitudinal direction.

As illustrated in FIG. 2, the cogged V-belt 1 can be adopted in a continuously variable transmission 30.

The continuously variable transmission 30 includes a driving pulley 31 and a driven pulley 32, respectively having V-shaped grooves 31x and 32x to which the cogged V-belt 1 is fitted. The cogged V-belt 1 is wound around the driving pulley 31 and the driven pulley 32 with a tension and is driven in a state where both side faces 1z of the cogged V-belt 1 are in contact with both side faces 31z and 32z respectively defining the grooves 31x and 32x of the driving pulley 31 and the driven pulley 32. The torque of the driving pulley 31 is transmitted to the driven pulley 32 via the cogged V-belt 1 by the frictional force generated at this time between the both side surfaces.

The driving pulley 31 and the driven pulley 32 respectively have fixed pulley pieces 31a and 32a, which respectively have the rotating shafts 31t and 32t, and movable pulley pieces 31b and 32b, which are attached so as to be movable in a direction along rotating shafts 31t and 32t with respect to the fixed pulley pieces 31a and 32a. When the movable pulley pieces 31b and 32b are moved in the direction along the rotating shafts 31t and 32t with respect to the fixed pulley pieces 31a and 32a, widths of the grooves 31x and 32x, which are formed between the fixed pulley pieces 31a and 32a and the movable pulley pieces 31b and 32b, change. A position of the cogged V-belt 1 in the grooves 31x and 32x changes according to the change in the widths of the grooves 31x and 32x. For example, when the state illustrated in (a) of FIG. 2 is shifted to the state illustrated in (b) of FIG. 2 (i.e., a width of the groove 31x is narrowed and a width of the groove 32x is widened), the cogged V-belt 1 moves in a direction away from the rotating shaft 31t in the groove 31x, and in a direction of approaching the rotating shaft 32t in the groove 32x. As a result, a winding radius of the cogged V-belt 1 in the driving pulley 31 and the driven pulley 32 changes. The continuously variable transmission 30 is configured to continuously change the winding radius in this manner, thereby changing a gear ratio in a stepless manner.

A method for manufacturing the cogged V-belt 1 will be described referring to FIG. 3.

The method according to the present embodiment includes an unvulcanized sleeve formation step S1, a vulcanized sleeve formation step S2, a cogless V-belt formation step S3, and a cog formation step S4.

The unvulcanized sleeve formation step S1 is a step of forming an annular unvulcanized sleeve. In the unvulcanized sleeve formation step S1, a cylindrical drum is used, and an unvulcanized rubber sheet for a compression rubber layer to be the compression rubber layer 5, an unvulcanized rubber sheet for a first adhesion rubber layer, which corresponds to a portion in contact with the compression rubber layer 5 in the adhesion rubber layer 4, the cord 4a, an unvulcanized rubber sheet for a second adhesion rubber layer, which corresponds to a portion in contact with the tension rubber layer 3 in the adhesion rubber layer 4, an unvulcanized rubber sheet for a tension rubber layer to be the tension rubber layer 3, and the reinforcing fabric 2, are laminated on an outer peripheral surface of the drum in this order. It should be noted that concave and convex corresponding to the plurality of cogs 1a are not provided on the outer peripheral surface of the drum.

Particularly, in the unvulcanized sleeve formation step S1, first, a plurality of sheet members including short fibers and laminated to each other are used as the unvulcanized rubber sheet for a compression rubber layer, and wound on the cylindrical drum, while the short fibers of each sheet member are oriented in the belt width direction (S1a). Then, the unvulcanized rubber sheet for a first adhesion rubber layer is laminated on the unvulcanized rubber sheet for a compression rubber layer (S1b). Then, the cord 4a is spirally spun onto the unvulcanized rubber sheet for a first adhesion rubber layer (S1c). Then, the unvulcanized rubber sheet for a second adhesion rubber layer is laminated on the cord 4a (S1d). Then, the unvulcanized rubber sheet for a tension rubber layer is laminated on the unvulcanized rubber sheet for a second adhesion rubber layer (S1e). Then, the reinforcing fabric 2 is laminated on the unvulcanized rubber sheet for a tension rubber layer (S1f).

An average length of the short fibers contained in the sheet member is preferably in the range of from 1 to 20 mm, more preferably in the range of from 1.2 to 15 mm, and further preferably in the range of from 2 to 6 mm. The reason for this is because, in the case where the average length of the short fibers is too short, there is a possibility that the mechanical properties (e.g., modulus) in the grain direction cannot be sufficiently increased; whereas in the case of too long, poor dispersion of the short fibers may occur in the rubber composition, which leads to cracks generated in the rubber, and the belt may be damaged at the early stage.

An average fiber diameter of the short fibers is preferably in the range of from 1 to 100 μm, more preferably in the range of from 3 to 50 μm, and further preferably in the range of from 5 to 30 μm. The reason for this is because, in the case where the average fiber diameter is too large, the mechanical properties of the compression rubber layer may be deteriorated; whereas in the case of too small, the friction coefficient of the surface may not be sufficiently reduced.

Furthermore, a blending amount (proportion) of the short fibers is preferably 30 parts by mass or less, more preferably from 8 to 30 parts by mass, still more preferably from 10 to 28 parts by mass, and desirably preferably from 12 to 25 parts by mass, based on 100 parts by mass of the rubber component. The reason for this is because, in the case where the proportion of short fibers is too small, the mechanical properties of the compression rubber layer may be deteriorated; whereas in the case of too large, in addition to decrease in transmission efficiency, dispersibility of the short fibers in the rubber composition may be deteriorated, causing a poor dispersion, whereby cracks may occur from that point in the compression rubber layer at the early stage.

Furthermore, it is preferable to use a sheet member having a thickness of from 0.2 to 2.5 mm and preferably from 0.5 to 1.6 mm per a single sheet, which is laminated as the unvulcanized rubber sheet for a compression rubber layer. The unvulcanized rubber sheet for a compression rubber layer is constituted by laminating a sheet member having the thickness falling within the range described above until reaching a predetermined thickness.

The vulcanized sleeve formation step S2 is a step of vulcanizing the obtained unvulcanized sleeve, to thereby form an annular vulcanized sleeve, after the unvulcanized sleeve formation step S1. In the vulcanized sleeve formation step S2, a well-known method may be adopted. For example, the unvulcanized sleeve may be vulcanized at a temperature of from about 120 to 200° C. (particularly from 150 to 180° C.) while a vulcanization jacket is put over the outside of the unvulcanized sleeve and the mold is placed in a vulcanization canister.

The cogless V-belt formation step S3 is a step of forming an annular cogless (no cog 1a is formed) V-belt after the vulcanized sleeve formation step S2. In the cogless V-belt formation step S3, after the vulcanization jacket and the vulcanized sleeve are taken out from the vulcanization canister, the vulcanized sleeve is cut into a predetermined width, and the side surface is cut by a cutter or the like so as to obtain a predetermined V angle, whereby the cogless V-belt is formed.

The cog formation step S4 is a step of forming the plurality of cogs 1a in the compression rubber layer 5 after the cogless V-belt formation step S3. In other words, the cogs 1a are not formed in the steps S1 to S3, and the cogs 1a are formed in the step S4.

In the cog formation step S4, any method may be adopted. For example, a water jet-processing machine may be used. An example of a procedure for forming the cogs 1a by using the water jet-processing machine will be described below.

First, a wood board, a plastic board, and a metal board are arranged in this order on a water tank of the water jet-processing machine, and fixed with a tape or the like. Four reference holes and grooves having the same shape as the belt inner peripheral side $1x$ including the plurality of cogs $1a$ are formed by a water jet on the metal plate arranged the uppermost. The four reference holes correspond to four pin holes formed in a cylindrical belt-fixing jig to which the annular cogless V-belt is fixed. Then, the annular cogless V-belt formed in S3 is attached to the belt-fixing jig with the compression rubber layer 5 on the outside and the tension rubber layer 3 on the inside. The belt-fixing jig is placed on the metal plate, and pins are inserted into the four pin holes of the belt-fixing jig and the four reference holes to fix the belt-fixing jig to the metal plate. Thereafter, data relating to the shape of the belt inner peripheral side $1x$ including the plurality of cogs $1a$ is read by a control unit of the water jet-processing machine. Processing conditions such as belt thickness and processing speed are inputted and processing is performed.

As described above, the present embodiment employs a method in which an unvulcanized sleeve is vulcanized to form a vulcanized sleeve and then a plurality of cogs $1a$ are formed, instead of a method of pressurizing an unvulcanized sleeve to flow an unvulcanized rubber sheet for a compression rubber layer to form a plurality of cogs $1a$ (see S1 to S4 in FIG. 3). Therefore, the problem that the flowing of the unvulcanized rubber sheet for a compression rubber layer becomes non-uniform, which causes a recess on the belt outer peripheral side $1y$ of the cog portion in the compression rubber layer 5, can be suppressed. Consequently, occurrence of cracks starting from the recess of the compression rubber layer 5 and peeling of the compression rubber layer 5 from another rubber layer (the adhesion rubber layer 4 in the present embodiment) can be suppressed.

In the present embodiment, in the unvulcanized sleeve formation step S1, the unvulcanized rubber sheet for a compression rubber layer containing short fibers is used and the short fibers are oriented in the belt width direction (see S1$a$ in FIG. 3). According to the aforementioned configuration, since the short fibers are oriented in the belt width direction, high anisotropy can be achieved and the elastic modulus in the belt width direction can be increased to effectively improve the lateral pressure resistance. Particularly in the case of being applied to a continuously variable transmission 30, since the cogged V-belt 1 is used in a harsh layout with being largely bent and under a high load, high durability and fuel saving performance (power transmission performance) are required. In this regard, according to the aforementioned configuration, since it is possible to improve the lateral pressure resistance (resistance to deformation due to lateral pressure), which is one of important factors balancing durability and fuel saving performance, both durability and fuel saving performance can be suitably enhanced. Therefore, the belt can be also applied to a continuously variable transmission 30 or the like, which requires high load transmission. Furthermore, in the configuration in which short fibers are blended into the compression rubber layer 5, in the case of employing a method in which, as described in PTL 1, an unvulcanized sleeve is pressurized to flow an unvulcanized rubber sheet for a compression rubber layer to form a plurality of cogs $1a$, since the flowing of the unvulcanized rubber sheet for a compression rubber layer becomes non-uniform, the orientation of the short fibers is also disturbed. Meanwhile, the present embodiment employs a method in which an unvulcanized sleeve is vulcanized to form a vulcanized sleeve and then a plurality of cogs $1a$ are formed, instead of the method of pressurizing an unvulcanized sleeve to flow an unvulcanized rubber sheet for a compression rubber layer to form a plurality of cogs $1a$. Therefore, the problem that the flowing of the unvulcanized rubber sheet for a compression rubber layer becomes non-uniform can be suppressed, and the disturbance of the orientation of short fibers can be also suppressed.

In the present embodiment, in the unvulcanized sleeve formation step S1, a plurality of sheet members each containing the short fibers and laminated with each other are used as the unvulcanized rubber sheet for a compression rubber layer (see S1$a$ in FIG. 3). According to the aforementioned configuration, since the short fibers are oriented in each of the plurality of sheet members having a relatively small thickness and they are laminated with each other, the orientation of short fibers can be easily achieved as compared with the case where the short fibers are oriented in a single sheet member which is used as the unvulcanized rubber sheet for a compression rubber layer. Furthermore, in the configuration in which the unvulcanized rubber sheet for a compression rubber layer includes a plurality of sheet members, in the case of employing a method in which, as described in PTL 1, an unvulcanized sleeve is pressurized to flow an unvulcanized rubber sheet for a compression rubber layer to form a plurality of cogs $1a$, since the flowing of the unvulcanized rubber sheet for a compression rubber layer becomes non-uniform, peeling can occur between the plurality of sheet members when the belt is used. Meanwhile, the present invention employs a method in which an unvulcanized sleeve is vulcanized to form a vulcanized sleeve and then a plurality of cogs $1a$ are formed, instead of the method of pressurizing an unvulcanized sleeve to flow an unvulcanized rubber sheet for a compression rubber layer to form a plurality of cogs $1a$. Therefore, the problem that the flowing of the unvulcanized rubber sheet for a compression rubber layer becomes non-uniform can be suppressed, and peeling hardly occurs between the plurality of the sheet members.

In the present embodiment, in the unvulcanized sleeve formation step S1, the unvulcanized rubber sheet for an adhesion rubber layer is disposed between the unvulcanized rubber sheet for a compression rubber layer and the unvulcanized rubber sheet for a tension rubber layer (see S1$a$ to S1$e$ in FIG. 3). In the case of employing a method in which, as described in PTL 1, an unvulcanized sleeve is pressurized to flow an unvulcanized rubber sheet for a compression rubber layer to form a plurality of cogs $1a$, the unvulcanized rubber sheet for a compression rubber layer draws the unvulcanized rubber sheet for an adhesion rubber layer when flowing into the concave portion of the drum, and a recess may be formed in the belt outer peripheral side $1y$ of the cog portion in the compression rubber layer 5, which may lead to a state where the adhesion rubber layer 4 enters in the recess. Meanwhile, the present embodiment employs a method in which an unvulcanized sleeve is vulcanized to form a vulcanized sleeve and then a plurality of cogs $1a$ are formed, instead of the method of pressurizing an unvulcanized sleeve to flow an unvulcanized rubber sheet for a compression rubber layer to form a plurality of cogs $1a$. Therefore, the problems such as the drawing of the unvulcanized rubber sheet for an adhesion rubber layer and entering the adhesion rubber layer 4 into the recess can be suppressed, cracks starting from the recess are hardly generated at the interface between the compression rubber layer 5 and the adhesion rubber layer 4, and peeling of the compression rubber layer 5 from the adhesion rubber layer 4 can be also suppressed.

In the unvulcanized sleeve formation step S1, the cord 4a extending in the belt longitudinal direction is disposed in the unvulcanized rubber sheets for an adhesion rubber layer (see S1b to S1d in FIG. 3). According to the aforementioned configuration, since the cord 4a is embedded in the adhesion rubber layer 4, durability is improved as compared with the case where the cord 4a is not embedded in the adhesion rubber layer 4 but is just in contact with the adhesion rubber layer 4.

EXAMPLES

The cogged V-belts (Examples 1 to 7) manufactured by the same method as in the aforementioned embodiment and the cogged V-belts (Comparative Examples 1 to 4) manufactured by the same method as in PTL 1 were subjected to a running test of in-vehicle U/D (UP/DOWN) durability and the state of the side surface of each cogged V-belt after the test was compared. The configurations of the cogged V-belts according to Examples 1 to 7 are shown in Table 1 and the configurations of the cogged V-belts according to Comparative Examples 1 to 4 are shown in Table 2.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| Composition of Compressed and Tension rubbers |  | Blend 1 | Blend 2 | Blend 3 | Blend 4 | Blend 5 | Blend 6 | Blend 1 |
| Belt Thickness (mm) |  | 9.5 | 9.5 | 9.5 | 9.5 | 9.5 | 9.5 | 9.5 |
| Cog Height (mm) |  | 3.9 | 3.9 | 3.9 | 3.9 | 3.9 | 3.9 | 4.7 |
| Belt Appearance after in-Vehicle Durability Test | Cog Crack | None | None | None | None | None | None | None |
|  | Peeling below Cord | None | None | None | None | None | None | None |

Examples 1 and 2 are examples of varying the average fiber length of short fibers with the same constituent material.

Example 3 is an example in which the same constituent material as in Example 1 is used but the average fiber diameter of short fibers is varied.

Example 4 is an example in which the same constituent material as in Example 1 is used but the blending amount of short fibers is varied.

Example 5 is an example in which the same constituent material as in Example 4 is used but the average fiber length of short fibers is varied.

Example 6 is an example in which the type of short fibers is changed.

Example 7 is an example in which the same constituent material as in Example 1 is used but the cog height is increased.

TABLE 2

|  |  | Com. Ex. 1 | Com. Ex. 2 | Com. Ex. 3 | Com. Ex. 4 |
|---|---|---|---|---|---|
| Composition of Compressed and Tension rubbers |  | Blend 1 | Blend 1 | Blend 1 | Blend 4 |
| Belt Thickness (mm) |  | 9.5 | 9.5 | 9.5 | 9.5 |
| Cog Height (mm) |  | 3.9 | 4.7 | 3.1 | 3.9 |
| Belt Appearance after in-Vehicle Durability Test | Cog Crack | 3.0 mm | 5.0 mm | 0.5 mm | 3.0 mm |
|  | Peeling below Cord | 0.5 mm | 1.0 mm | None | 2.0 mm |

In the manufacturing steps according to Examples 1 to 7 and the manufacturing steps according to Comparative Examples 1 to 4, the steps were performed under the same conditions except for the step of forming the cogs 1a. In Examples 1 to 7 and Comparative Examples 1 to 4, vulcanization was performed at 160° C. for 20 minutes while a vulcanization jacket was put over the outside of the unvulcanized sleeve and the mold was placed in a vulcanization canister. The sizes of the cogged V-belts according to Examples 1 to 7 and Comparative Examples 1 to 4 were set as follows: the outer circumference length was 800 mm, the upper width was 20.0 mm, the belt thickness was 9.5 mm, and the cog height was a respective value shown in Table 1 and Table 2.

In Examples 1 to 7, in the cog formation step S4, a method using a water jet-processing machine exemplified in the aforementioned embodiment was adopted.

Equipment used (water jet-processing machine): MACH3B Model 1313 (manufactured by Flow Japan Co., Ltd.)

Diameter of pin hole and reference hole: 10 mm in diameter

Processing condition: belt thickness of 20 mm, and processing speed of 240 mm/min In Examples 1 to 7 and Comparative Examples 1 to 4, the unvulcanized rubber sheet for a compression rubber layer and the unvulcanized rubber sheet for a tension rubber layer were prepared by blending the materials listed in Table 3 (Blend 1 to Blend 6), subjecting the blends to a rubber-kneading with a Banbury mixer or the like, respectively, and press-rolling the produced kneaded rubbers by passing through a calender roll. In Examples 1 to 7 and Comparative Examples 1 to 4, the unvulcanized rubber sheet for a first adhesion rubber layer and the unvulcanized rubber sheet for a second adhesion rubber layer were prepared by blending the materials listed in Table 4, subjecting the blend to a rubber-kneading with a Banbury mixer or the like, and press-rolling the produced kneaded rubber by passing through a calender roll.

TABLE 3

|  |  | Materials (Parts by Mass) |  |  |  |  |  |
|---|---|---|---|---|---|---|---|
|  |  | Blend 1 | Blend 2 | Blend 3 | Blend 4 | Blend 5 | Blend 6 |
| Chloroprene Rubber |  | 100 | 100 | 100 | 100 | 100 | 100 |
| Short fibers | Aramid (a) | 25 | — | — | 12 | — | 10 |
|  | Aramid (b) | — | 25 | — | — | — | — |
|  | Aramid (c) | — | — | 25 | — | — | — |
|  | Aramid (d) | — | — | — | — | 12 | — |
|  | Polyamide 66 | — | — | — | — | — | 15 |
| Naphthenic Oil |  | 5 | 5 | 5 | 5 | 5 | 5 |
| Magnesium Oxide |  | 4 | 4 | 4 | 4 | 4 | 4 |
| Carbon Black |  | 40 | 40 | 40 | 40 | 40 | 40 |
| Antiaging Agent |  | 4 | 4 | 4 | 4 | 4 | 4 |
| Zinc Oxide |  | 5 | 5 | 5 | 5 | 5 | 5 |
| N,N'-m-phenylene-dimaleimide |  | 2 | 2 | 2 | 2 | 2 | 2 |
| Stearic Acid |  | 1 | 1 | 1 | 1 | 1 | 1 |
| Sulfur |  | 0.5 | 0.5 | 0.5 | 0.5 | 0.5 | 0.5 |

TABLE 4

| Materials (Parts by Mass) |  |
|---|---|
| Chloroprene Rubber | 100 |
| Naphthenic Oil | 5 |
| Magnesium Oxide | 4 |

TABLE 4-continued

| Materials (Parts by Mass) | |
|---|---|
| Silica | 30 |
| Carbon Black | 20 |
| Resorcinol-formalin Condensate | 2 |
| Antiaging Agent | 4 |
| Zinc Oxide | 5 |
| Vulcanization Accelerator | 1 |
| Stearic Acid | 2 |
| Hexamethoxy Methylol Melamine | 2 |
| Total | 175 |

Details of the materials listed in Table 3 and Table 4 are as follows.

Short Fiber:

Aramid short fiber (a): Conex short fiber manufactured by Teijin, with average fiber length of 3 mm and average fiber diameter of 14 μm Aramid short fiber (b): Conex short fiber manufactured by Teijin, with average fiber length of 6 mm and average fiber diameter of 14 μm Aramid short fiber (c): Conex short fiber manufactured by Teijin, with average fiber length of 3 mm and average fiber diameter of 20 μm Aramid short fiber (d): Conex short fiber manufactured by Teijin, with average fiber length of 2 mm and average fiber diameter of 14 μm Polyamide 66 short fiber: Nylon 66 fiber manufactured by Toray, with average fiber length of 6 mm and average fiber diameter of 30 μm Naphthenic oil: "RS 700" manufactured by DIC Corporation Carbon black: "Seast 3" manufactured by Tokai Carbon Co., Ltd.

Antiaging agent: "Nonflex OD3" manufactured by Seiko Chemical Industry Co., Ltd.

Vulcanization accelerator: tetramethylthiuram disulfide (TMTD)

Silica: "Nipsil VN3" manufactured by Tosoh Silica Co., Ltd.

In Examples 1 to 7 and Comparative Examples 1 to 4, as the cord 4a, used was an organzine cord formed by twisting polyethylene terephthalate (PET) fibers of 1,000 denier in a 2×3 twist configuration with a primary twist coefficient of 3.0 and a secondary twist coefficient of 3.0, to form a cord with a total denier of 6,000, followed by conducting an adhesion treatment.

In Examples 1 to 7 and Comparative Examples 1 to 4, as the reinforcing fabric 2, used was a rubber-adhered canvas formed by subjecting a plain weave canvas using cotton spun yarn to a dip treatment with an RFL liquid, thermally treating the canvas at 150° C. for 2 minutes, followed by conducting a friction processing of rubbing the rubber composition of Table 4.

In the running test of in-vehicle U/D durability, each of the cogged V-belts according to Examples 1 to 7 and Comparative Examples 1 to 4 was attached to a belt-type continuously variable transmission of a vehicle (motor scooter). In a chassis dynamo test machine, running was performed up to the running distance of 10,000 km according to a pattern shown in FIG. 4 (i.e., UP/DOWN running repeating the throttle fully-opened state (for 90 seconds aiming at 90 km/h) and the throttle fully-closed state (for 30 seconds in the idling state) from the idling state).

The state of the side surface of the each of cogged V-belt according to Examples 1 to 7 and Comparative Examples 1 to 4 was observed after the completion of the running test of in-vehicle U/D durability. In particular, presence or absence (and its degree) of (1) cracks due to interlayer peeling in the compression rubber layer (cog cracks) and (2) interfacial peeling below cord (peeling below cord) caused by lateral pressure deformation due to poor lateral pressure resistance were observed, which are influenced by the orientation disturbance of the short fibers due to the flowing of rubber in the compression rubber layer. The observation results according to Examples 1 to 7 and Comparative Examples 1 to 4 are summarized in Table 1 and Table 2.

In Comparative Example 1, since the plurality of cogs were formed by making the compression rubber layer flow in accordance with a formation using a conventional mold, the flowing of rubber occurred in the compression rubber layer, thereby causing cog cracks and peeling below cord. In detail, as illustrated in (a) of FIG. 5, a recess 5x was formed on the belt outer peripheral side 1y of the cog portion in the compression rubber layer 5, the adhesion rubber layer 4 was in a state of entering into the recess 5x, and furthermore, the adhesion rubber layer 4 was peeled off from the cord 4a (peeling below cord). In addition, at the interface between the compression rubber layer 5 and the adhesion rubber layer 4, a crack 5y1 was generated starting from the recess 5x. In the inside of the compression rubber layer 5, the shape of the flowing clearly appeared, cracks 5y2 and 5y3 (cog cracks) occurred between the plurality of sheet members, and peeling occurred between the plurality of sheet members.

Comparative Example 2 is an example in which the cog height was set to be larger than that of Comparative Example 1. Probably because the flowing of rubber in the compression rubber layer increased and the orientation disturbance of the short fibers also increased as the cog height increased, cog cracks and peeling below cord occurred even more.

Comparative Example 3 is an example in which the cog height was set to be smaller than that of Comparative Example 1. Probably because the flowing of rubber in the compression rubber layer was reduced and the orientation disturbance of short fibers was also reduced as the cog height decreased, there was no peeling under cord, but cog cracks slightly occurred.

Comparative Example 4 is an example in which the blending amount of short fibers was reduced as compared with Comparative Example 1. Cog cracks occurred to the same extent as in Comparative Example 1, and peeling under cord increased probably because the lateral pressure resistance was more insufficient.

On the other hand, when the state of the side surface of each cogged V-belt according to Examples 1 to 7 was observed after the test, cog cracks and peeling below cord did not occur at all.

Although preferred embodiments and examples of the present invention have been described above, the present invention is not limited to the above-described embodiments, and various design modifications can be made therein as long as they are not departed from the scope of claims.

A plurality of cogs may be provided not only on the belt inner peripheral side but also on the belt outer peripheral side.

The reinforcing fabric may also be provided on the belt inner peripheral side, and it may not be provided on either the belt inner peripheral side or the belt outer peripheral side. Furthermore, the reinforcing fabric may be embedded in the compression rubber layer or the tension rubber layer. In the case where the reinforcing fabric is provided on the belt inner peripheral side, the reinforcing fabric may be adhered to the surface of the compression rubber layer by a known method after the cog formation step.

The short fibers may not be contained in the unvulcanized rubber sheet for a tension rubber layer. Furthermore, the short fibers may not be contained in any of the unvulcanized rubber sheet for a compression rubber layer and the unvulcanized rubber sheet for a tension rubber layer.

The unvulcanized rubber sheet for a compression rubber layer is not limited to be composed of a plurality of sheet members, and may be composed of a single sheet member.

The cord may be merely brought into contact with the adhesion rubber layer without being embedded in the adhesion rubber layer (e.g., in the unvulcanized sleeve formation step, the cord may be disposed between the unvulcanized rubber sheet for an adhesion rubber layer and the unvulcanized rubber sheet for a tension rubber layer, or may be disposed between the unvulcanized rubber sheet for an adhesion rubber layer and the unvulcanized rubber sheet for a compression rubber layer). Furthermore, the adhesion rubber layer may be omitted.

The cross-section of the cogged V-belt, which is orthogonal to the belt longitudinal direction, is not limited to the inverted trapezoidal shape. For example, the side surface of the tension rubber layer may be parallel to the belt thickness direction, or may be inclined in such a direction that the belt width becomes narrower as going toward the belt outer peripheral side.

The present application is based on Japanese Patent Application No. 2016-167011 filed on Aug. 29, 2016 and Japanese Patent Application No. 2017-158621 filed on Aug. 21, 2017, the contents of which are incorporated herein by reference.

REFERENCE SIGNS LIST

1 Cogged V-belt
1a Cog
1x Belt inner peripheral side
1y Belt outer peripheral side
3 Tension rubber layer
4a Cord
5 Compression rubber layer
5x Recess
5y1 to 5y3 Crack

The invention claimed is:

1. A method for manufacturing a cogged V-belt having a plurality of cogs on a belt inner peripheral side, which cogs are arranged each extending in a belt width direction and spaced apart from each other in a belt longitudinal direction, the method comprising:
 an unvulcanized sleeve formation step of laminating a plurality of unvulcanized rubber sheets comprising at least an unvulcanized rubber sheet to be a compression rubber layer disposed on the belt inner peripheral side and an unvulcanized rubber sheet to be a tension rubber layer disposed on a belt outer peripheral side, thereby forming an unvulcanized sleeve;
 a vulcanized sleeve formation step of vulcanizing the unvulcanized sleeve after the unvulcanized sleeve formation step, thereby forming a vulcanized sleeve; and
 a cog formation step of forming the plurality of cogs by water jet-processing the compression rubber layer after the vulcanized sleeve formation step,
 wherein the unvulcanized sleeve formation step further comprises
  laminating to each other a plurality of sheet members, which each contain short fibers oriented in the belt width direction, the laminated plurality of sheet members forming the unvulcanized rubber sheet for the compression rubber layer, and
  laminating the unvulcanized rubber sheet, which is for the tension rubber layer, on the unvulcanized rubber sheet, which is for the compression rubber layer.

2. The method for manufacturing a cogged V-belt according to claim 1, wherein the unvulcanized sleeve formation step further comprises:
 laminating an unvulcanized rubber sheet to be an adhesion rubber layer on the unvulcanized rubber sheet for the compression rubber layer, wherein the laminating the unvulcanized rubber sheet, which is for the tension rubber layer, on the unvulcanized rubber sheet, which is for the compression rubber layer, comprises laminating the unvulcanized rubber sheet, which is for the tension rubber layer, on the unvulcanized rubber sheet, which is for the adhesion rubber layer.

3. The method for manufacturing a cogged V-belt according to claim 2, wherein the unvulcanized sleeve formation step further comprises disposing a cord extending in the belt longitudinal direction in the unvulcanized rubber sheet for the adhesion rubber layer.

* * * * *